US012576765B2

(12) United States Patent
Shen et al.

(10) Patent No.: US 12,576,765 B2
(45) Date of Patent: Mar. 17, 2026

(54) SEAT HEADREST AND VEHICLE SEAT

(71) Applicant: Yanfeng International Automotive Technology Co., Ltd., Shanghai (CN)

(72) Inventors: Yineng Shen, Shanghai (CN); Xinze Zhang, Shanghai (CN); Xiaocui Zhang, Shanghai (CN); Aiping Zhang, Shanghai (CN); Kunjia Gan, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 176 days.

(21) Appl. No.: 18/565,839

(22) PCT Filed: Mar. 8, 2022

(86) PCT No.: PCT/CN2022/079677
§ 371 (c)(1),
(2) Date: Nov. 30, 2023

(87) PCT Pub. No.: WO2023/000682
PCT Pub. Date: Jan. 26, 2023

(65) Prior Publication Data
US 2024/0140287 A1 May 2, 2024

(30) Foreign Application Priority Data

Jul. 21, 2021 (CN) .......................... 202121661847.6

(51) Int. Cl.
*B60N 2/829* (2018.01)
(52) U.S. Cl.
CPC .................................... *B60N 2/829* (2018.02)

(58) Field of Classification Search
CPC ...................................................... B60N 2/829
See application file for complete search history.

(56) References Cited

U.S. PATENT DOCUMENTS

2002/0024247 A1* 2/2002 Mori ...................... B60N 2/838
297/391

FOREIGN PATENT DOCUMENTS

| CN | 102795133 | A | 11/2012 |
|----|-----------|---|---------|
| CN | 106828232 | A | 6/2017 |
| CN | 108688540 | A | 10/2018 |
| CN | 208344015 | U | 1/2019 |
| CN | 209112003 | U | 7/2019 |

(Continued)

OTHER PUBLICATIONS

International Preliminary Report on Patentability for PCT/CN2022/079677 mailed Jan. 18, 2024, 4 pages.

(Continued)

*Primary Examiner* — Anthony D Barfield
(74) *Attorney, Agent, or Firm* — Cooley LLP

(57) ABSTRACT

The present invention relates to a seat headrest device comprising a fixed base (30), a headrest (20) and a headrest electric motor (40). The headrest electric motor (40) drives the headrest (20) to move relative to the fixed base (30) through a composite motion mechanism comprising a screw-nut mechanism (70) and a pinion-rack mechanism (10). The present invention further discloses a seat headrest device comprising the seat headrest device. The seat headrest device has the following characteristics: a stroke of the headrest can be significantly enhanced by means of the composite movement mechanism.

18 Claims, 14 Drawing Sheets

(56)　　　　　References Cited

FOREIGN PATENT DOCUMENTS

| | | | |
|---|---|---|---|
| CN | 212047040 | U | 12/2020 |
| CN | 213676465 | U | 7/2021 |
| DE | 10014989 | A1 | 9/2001 |
| JP | H06999 | Y2 * | 1/1994 |
| KR | 20060100333 | A | 9/2006 |
| WO | WO-2023000682 | A1 | 1/2023 |

OTHER PUBLICATIONS

International Search Report and Written Opinion mailed on Jul. 28, 2021, for PCT Application No. PCT/CN2022/079677, 14 pages.
Extended European Search Report for European Application No. 22844855.1 mailed Jul. 7, 2025; 9 pages.

* cited by examiner

SEAT HEADREST AND VEHICLE SEAT

RELATED APPLICATIONS

This application is a national stage of International Application No. PCT/CN2022/079677, filed Mar. 8, 2022, which claims priority to Chinese Patent Application No. 202121661847.6, filed Jul. 21, 2021. Both of the aforementioned applications are hereby incorporated by reference in their entireties.

TECHNICAL FIELD

The present invention relates to the technical field of vehicles, and in particular, to a seat headrest and a vehicle seat, wherein the seat headrest may be in particular configured for a zero-gravity vehicle seat.

BACKGROUND OF INVENTION

With the development of the automobile industry and the change of the automobile market, for improvement of the user experience, more, higher and more comfort requirements are provided for automobile seats. In combination with the trend of zero-gravity seats, not only a large-stroke adjustment of a headrest but also a delicate shape and appearance of a seat are expected.

The Chinese utility model CN 208344015U discloses an electric headrest, comprising: a hollow headrest body; a support rod, which is configured as a U-shaped pipe, wherein a bottom of the U-shape of the support rod is arranged in the headrest body, and two ends of the support rod extend outwards from the bottom of the headrest body; and a driving assembly, which is fixedly mounted inside the headrest body and drives the headrest body to move up and down along the support rod. Here, an electric motor drives a lead screw to rotate, and hence the lead screw moves up and down relative to a screw sleeve, wherein the electric motor is fixedly connected with the headrest body, and the headrest body and the electric motor can move up and down along the support rod, so that a height of the headrest meets the requirements of different users, the overall structure is simple, and the use is convenient.

The Chinese utility model CN212047040U discloses a drive module for electrically lifting a headrest for an automobile, wherein a headrest lifting device is arranged in a seat backrest framework, wherein a top part of the headrest lifting device is connected with the seat backrest framework by means of two snap-fit devices, a bottom part of the headrest lifting device is connected with a bottom of a headrest rod, wherein the bottom part and the top part of the headrest lifting device are movable relative to each other to realize a lifting movement of the headrest rod, wherein the snap-fit devices are two-parts respectively, with an upper and a lower part, wherein a lower surface of the upper part has an engagement protrusion and an upper surface of the lower part has a groove, wherein the engagement protrusion can engage into the groove in a corresponding position, wherein an upper end of the snap-fit device has a positioning groove, through which the upper part of the snap-fit device is positioned on the seat backrest framework. The headrest drive module enables a separate drive module detachable from the seat structure, wherein a user can freely select the function configuration of the electric lifting headrest on the same seat backrest platform according to individual requirements. Here, the electric motor is stationary, while the headrest can move up and down together with a guide rod and plastic parts.

The Chinese invention application CN108688540A discloses an electric headrest device, wherein an electric motor is configured to electrically adjust a position in an up-down direction and a position in a front-back direction of a headrest arranged at an upper end of a seat backrest of a vehicle. Here, the electric motor is stationary and is configured to drive a headrest to move in the up-down direction and in the front-back direction.

The inventors of the present application found in the research and development of products, in the prior art, a headrest is driven by a screw-nut mechanism, wherein a stroke of the headrest is identical to a movement stroke of an output member of the screw-nut mechanism, which may have the following problems:

1. The headrest has an insufficient stroke. Especially when a zero-gravity function of a zero-gravity vehicle seat is realized, the up-down movement stroke of the headrest can't meet the requirements on the comfort of different users well.
2. The occupied space is large. The height-adjusting mechanism is arranged inside a seat backrest and needs to occupy a large space in the seat backrest.
3. The appearance isn't perfect. When the headrest has a large stroke, some parts are exposed, and hence the overall appearance of the seat is influenced.

SUMMARY OF INVENTION

An object of the invention is to provide a seat headrest device and a vehicle seat comprising the same, in particular a zero-gravity vehicle seat, wherein a stroke of the headrest can be enhanced. Another object of the invention is to provide a seat headrest device which occupies a small space in a seat backrest and has a good appearance.

For this purpose, a zero-gravity seat headrest according to the present application comprises a fixed base, which is configured to be mounted to a seat backrest, a headrest and a headrest electric motor, characterized in that, the seat headrest device further comprises a composite motion mechanism comprising a screw-nut mechanism and a pinion-rack mechanism, wherein the headrest electric motor can drive the headrest to move relative to the fixed base through the composite motion mechanism.

In a preferable embodiment, the headrest electric motor can drive the headrest to move translationally relative to the fixed base through the composite motion mechanism.

In a preferable embodiment, the headrest electric motor can drive the headrest to move up and down relative to the fixed base through the composite motion mechanism.

In a preferable embodiment, the seat headrest device is configured for a zero-gravity vehicle seat.

In a preferable embodiment, the seat headrest device further comprises a headrest support rod configured to mount the fixed base to a seat backrest.

In a preferable embodiment, the screw-nut mechanism comprises a lead screw that is drivable by the headrest electric motor to rotate and a nut that is movable along the lead screw, and the pinion-rack mechanism comprises a pinion coupled to the nut and a movable rack coupled to the headrest.

In a preferable embodiment, the pinion is coupled to the nut by a slider, wherein the nut is fixedly mounted to the slider, and the pinion is rotatably mounted to the slider.

In a preferable embodiment, the pinion is rotatably mounted to the slider by a countersunk screw and a bushing sleeved on the countersunk screw, wherein the countersunk screw is fixed to the slider.

In a preferable embodiment, the headrest is fixed with the movable rack.

In a preferable embodiment, the pinion-rack mechanism further comprises a fixed rack, wherein the fixed rack and the movable rack are opposite to each other with respect to the pinion and engage with the pinion respectively.

In a preferable embodiment, the headrest has a chamber, and the seat headrest device comprises an internal base, which is arranged in the chamber of the headrest, penetrates through the headrest and is fixed to the fixed base.

In a preferable embodiment, the headrest electric motor, the screw-nut mechanism and the pinion-rack mechanism are arranged in the chamber of the headrest. Optionally, the headrest electric motor is fixedly mounted to the internal base.

In a preferable embodiment, the headrest electric motor is fixed to a slider base (the internal base is configured as the slider base), wherein the slider base is arranged in the headrest and penetrates through the headrest and is fixed to the fixed base, wherein the headrest electric motor drives the headrest to move up and down relative to the slider base through the composite motion mechanism comprising the screw-nut mechanism and the pinion-rack mechanism, wherein the headrest is movably supported on the slider base through the pinion-rack mechanism.

In a preferable embodiment, the seat headrest device further comprises a slider arranged in the chamber of the headrest, wherein the slider is drivable by the headrest electric motor to move up and down relative to the internal base through the screw-nut mechanism, wherein a nut of the screw-nut mechanism is mounted to the slider, and a lead screw of the screw-nut mechanism is connected with an output shaft of the headrest electric motor, wherein the pinion-rack mechanism comprises a pinion, a fixed rack and a movable rack, wherein the fixed rack is fixed to the internal base, the movable rack is fixed to the headrest, and the pinion is rotatably mounted to the slider, wherein the pinion engages both the fixed rack and the movable rack, wherein the fixed rack and the movable rack are opposite to each other with respect to the pinion.

In a preferable embodiment, the slider has a nut receptacle that receives the nut, and the internal base has a guide groove for the nut receptacle, wherein the nut receptacle is guidable in the guide groove for the nut receptacle.

In a preferable embodiment, the slider and the internal base are coupled in a slidable manner through a first sliding rail structure, and the headrest and the slider are coupled in a slidable manner through a second sliding rail structure.

In a preferable embodiment, the headrest comprises a headrest front cover and a headrest rear cover, preferably wherein the headrest front cover and the headrest rear cover are connected through a fastener, preferably wherein the movable rack is fixedly mounted to the headrest front cover or the headrest rear cover.

In a preferable embodiment, the seat headrest device comprises one set of screw-nut mechanism and two sets of pinion-rack mechanisms arranged side-by-side, wherein the one set of screw-nut mechanism is arranged between the two sets of pinion-rack mechanisms.

In a preferable embodiment, the respective fixed racks of the two sets of pinion-rack mechanisms and the slider form a U-shaped part, wherein the respective pinions of the two sets of pinion-rack mechanisms are arranged between the two fixed racks and engage with the associated fixed racks.

In a preferable embodiment, the headrest front cover is provided with the respective movable racks of the two sets of pinion-rack mechanisms.

The object of the invention is also achieved through a vehicle seat, which comprises the seat headrest device according to any one of the embodiments of the present invention.

In some embodiments, the seat headrest device according to the present application may have the following characteristics in comparison with the prior art:

1. By means of the composite motion mechanism, the stroke of the headrest can be largely enhanced. For example, in comparison with the known headrest with a screw-nut mechanism, the stroke may be doubled.

2. Both an expected stroke of the headrest and a good appearance of the headrest and a vehicle seat are enabled.

3. The headrest adjusting mechanism comprising the screw-nut mechanism and the pinion-rack mechanism can meet the requirements on zero-gravity seats.

EMBODIMENTS

Figure 1:
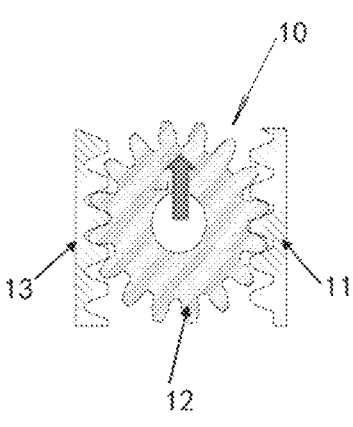
FIG. 1 is a schematic view of a pinion-rack mechanism according to the present application in an engagement state.
Figures 2, 3:
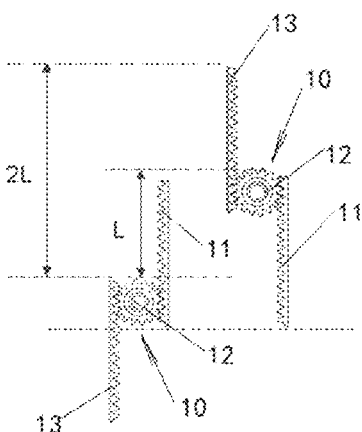
FIG. 2 is a schematic view of the pinion-rack mechanism when it moves downwards to a maximum stroke.
FIG. 3 is a schematic view of the pinion-rack mechanism when it moves upwards to a maximum stroke.
Figures 4, 5:
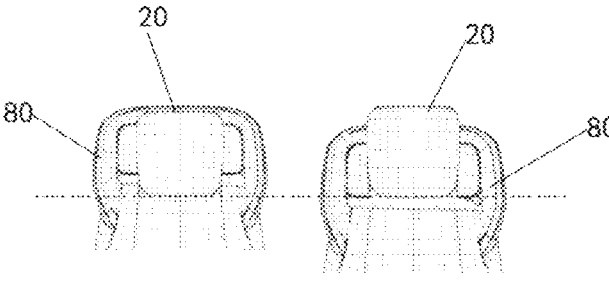
FIG. 4 is a schematic view of a known headrest with a screw-nut mechanism only, in an initial state.
FIG. 5 is a schematic view of the known headrest with the screw-nut mechanism only, when it moves to an uppermost position.
Figures 6, 7:
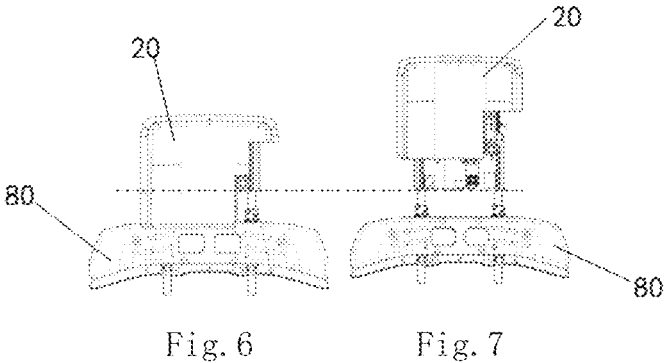
FIG. 6 is a schematic view of the headrest according to the present application in an initial state.
FIG. 7 is a schematic view of the headrest according to the present application, when it's driven to an uppermost position through a composite motion mechanism comprising a screw-nut mechanism and a pinion-rack mechanism.

A seat headrest device according to the present application is further described below with reference to the accompanying drawings and specific embodiments.

The seat headrest device is in particular configured for a zero-gravity vehicle seat, and may have the following basic principle: as shown in FIGS. 1 to 7, a headrest 20 can be driven to move up and down relative to a seat backrest 80 (not shown in FIGS. 1 and 2) by means of a pinion-rack mechanism 10 comprising a fixed rack 11, a pinion 12 and a movable rack 13 in engagement. A stroke L of the up-down movement of the headrest 20 is achieved by means of a screw-nut mechanism 70 only. The headrest 20 can be driven to move up and down relative to a fixed base 30 by means of a composite motion mechanism comprising the screw-nut mechanism 70 and the pinion-rack mechanism 10, wherein a stroke of the up-down movement of the headrest 20 can be doubled to 2L.

Figure 8:
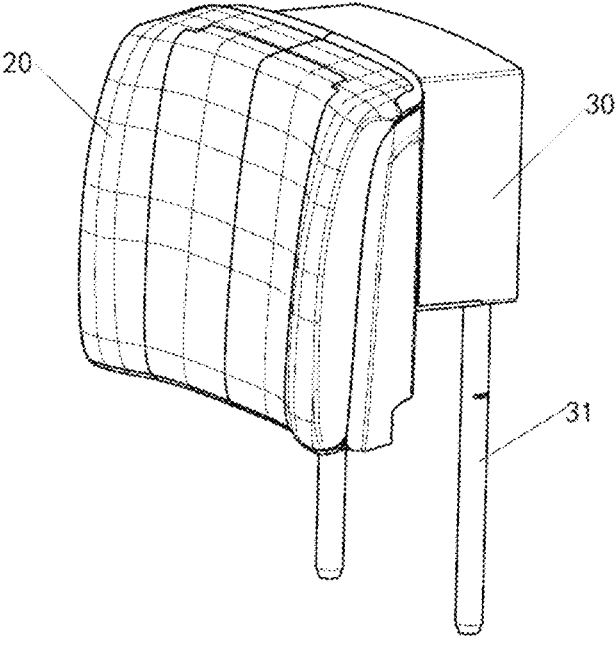
FIG. 8 is a three-dimensional schematic view of a zero-gravity seat headrest device according to the present application.
Figure 9:
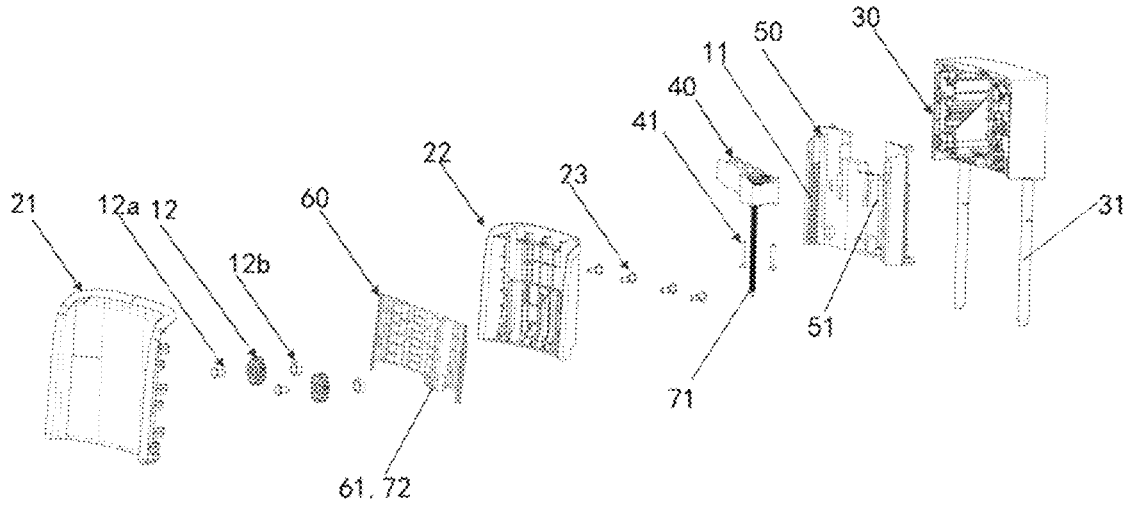
FIG. 9 is an exploded view of the zero-gravity seat headrest device according to the present application.

Referring to FIG. 8 and FIG. 9, they show a specific embodiment of the present application (It's noted, the specific embodiment as described below is merely an exemplary illustration of the seat headrest device of the present application, and doesn't restrict the protection scope defined by the claims). The seat headrest device may be in particular configured for a zero-gravity vehicle seat, but it may also be generally applicable to a wide variety of vehicle seats.

The zero-gravity seat headrest device may comprise the fixed base 30, the headrest 20, a headrest electric motor 40, a slider base 50, a slider 60, the screw-nut mechanism 70 and the pinion-rack mechanism 10.

In the shown embodiment, the base 50 is configured as a base for the slider 60, and thus may be referred to as a "slider base". The slider may be generally understood as a slidable part, which may have a planar, block, or any other suitable geometry. It will be appreciated that the base 50 may be arranged in the headrest 20, as a base for many components, and thus may be generally referred to as an "internal base".

The fixed base 30 is mounted to a seat backrest 80 through a headrest support rod 31. A specific mounting process is known in the prior art, and thus isn't described in detail again.

The headrest 20 comprises a headrest front cover 21 and a headrest rear cover 22, which are fixed together through a fastener such as screws 23 to form the headrest 20.

The headrest electric motor 40, the slider base 50, the slider 60, the screw-nut mechanism 70 and the pinion-rack mechanism 10 are all arranged in the headrest 20, wherein the stroke of the headrest satisfies the requirements, and both the headrest 20 and the seat backrest 80 have a good appearance.

The headrest 20 is movably supported on the slider base 50 through the pinion-rack mechanism 10, the slider 60 and the screw-nut mechanism 70, and the headrest 20 is driven to move up and down relative to the slider base 50 through the composite motion mechanism comprising the screw-nut mechanism 70 and the pinion-rack mechanism 10, so that the stroke of the headrest 20 is doubled in comparison with the stroke in the case of the known screw-nut mechanism.

The slider base 50 is arranged in the headrest 20, and penetrates through the headrest rear cover 22 and is fixed to the fixed base 30, wherein the headrest rear cover 22 moves up and down relative to the slider base 50. For example, a lower part of the slider base 50 is fixed to the fixed base 30.

Figure 10:
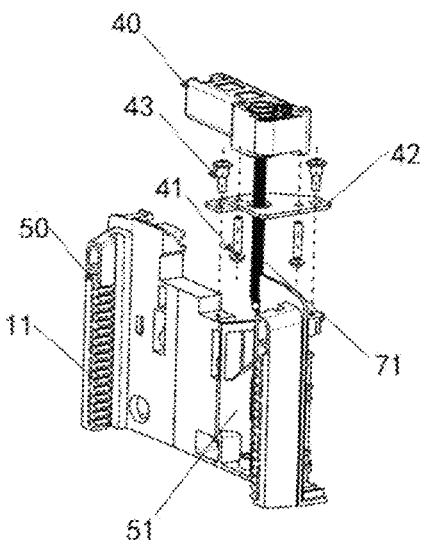
FIG. 10 is a schematic view for illustrating that a headrest electric motor is mounted to a slider base in the zero-gravity seat headrest device according to the present application.
Figure 11:
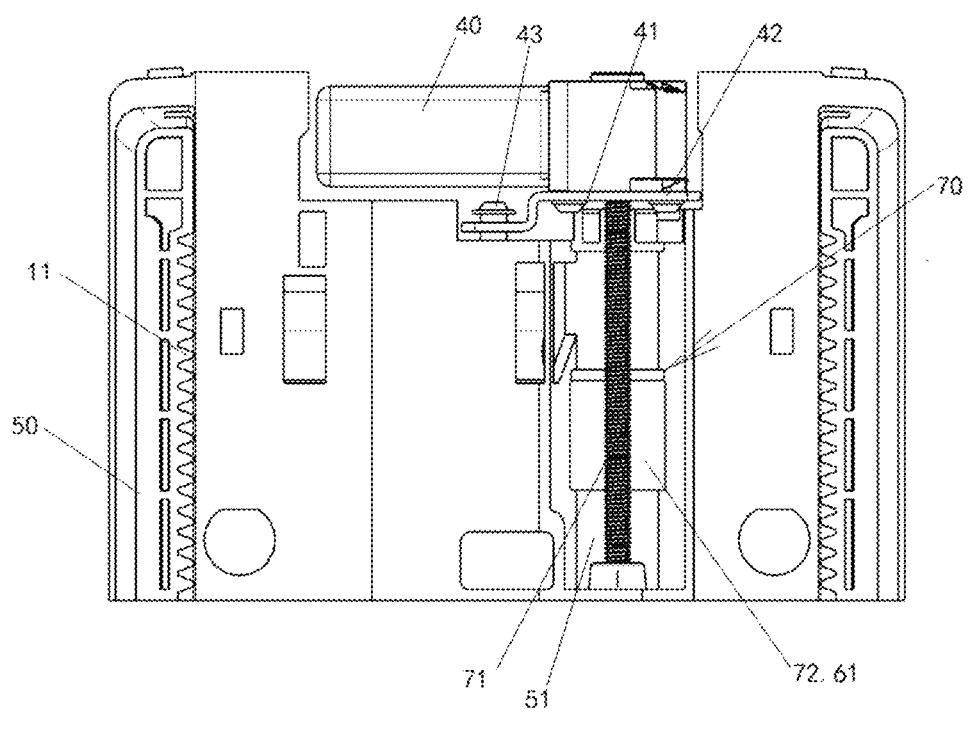
FIG. 11 is a front view for illustrating that the headrest electric motor is mounted to the slider base in the zero-gravity seat headrest device according to the present application.
Figure 12:
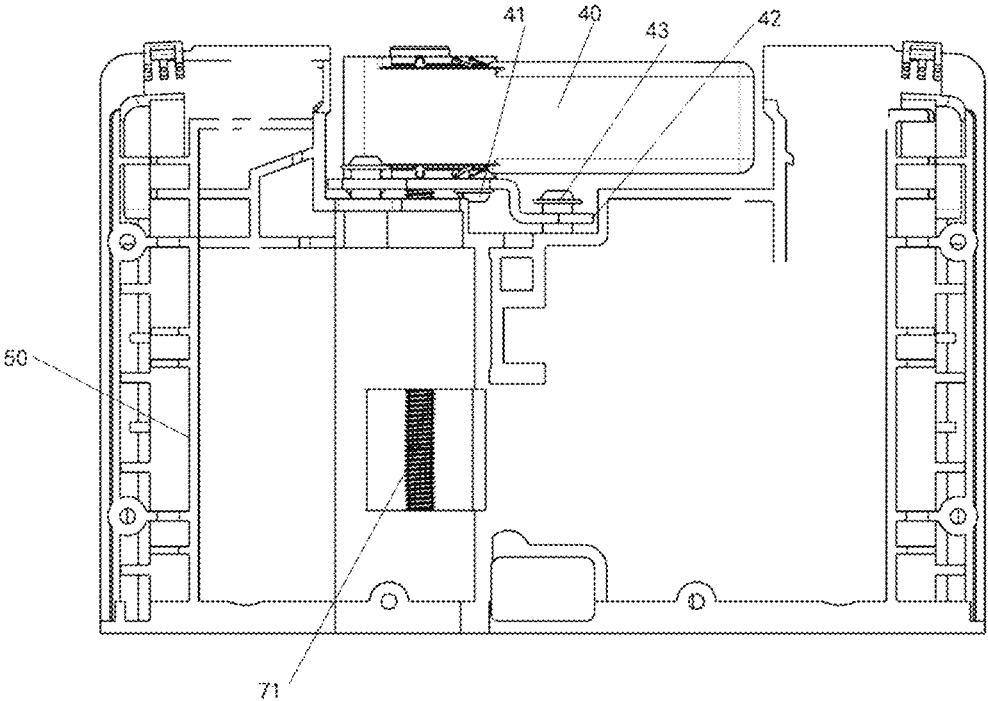
FIG. 12 is a rear view for illustrating that the headrest electric motor is mounted to the slider base in the zero-gravity seat headrest device according to the present application.
Figure 13:
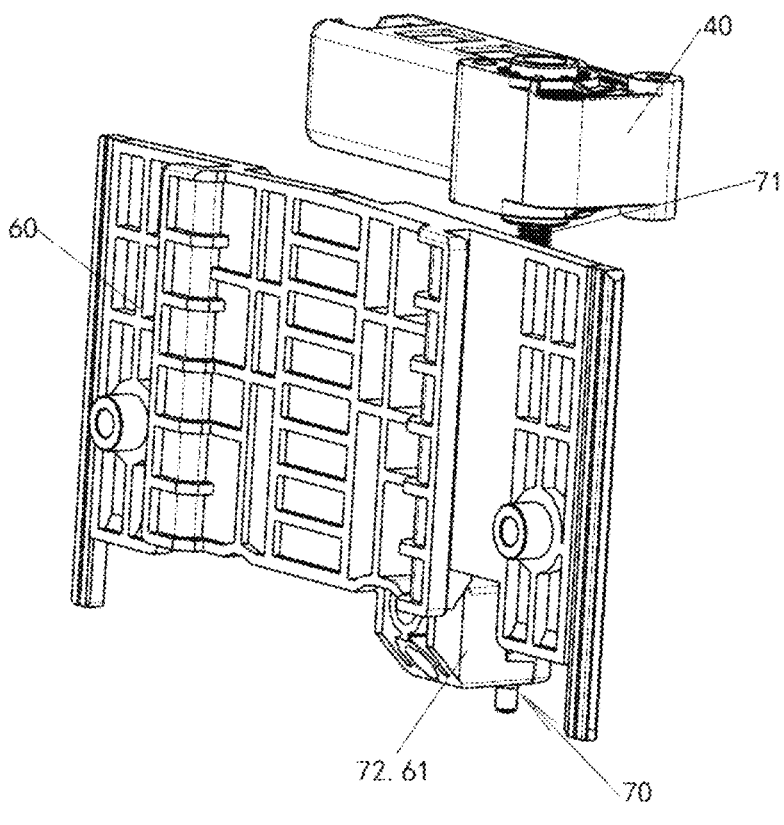
FIG. 13 is a three-dimensional schematic view for illustrating a drive connection between the headrest electric motor and the slider in the zero-gravity seat headrest device according to the present application.
Figure 14:
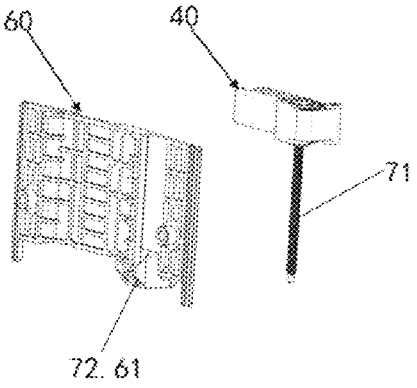
FIG. 14 is a schematic exploded view of the headrest electric motor and the slider in the zero-gravity seat headrest device according to the present application.
Figure 15:
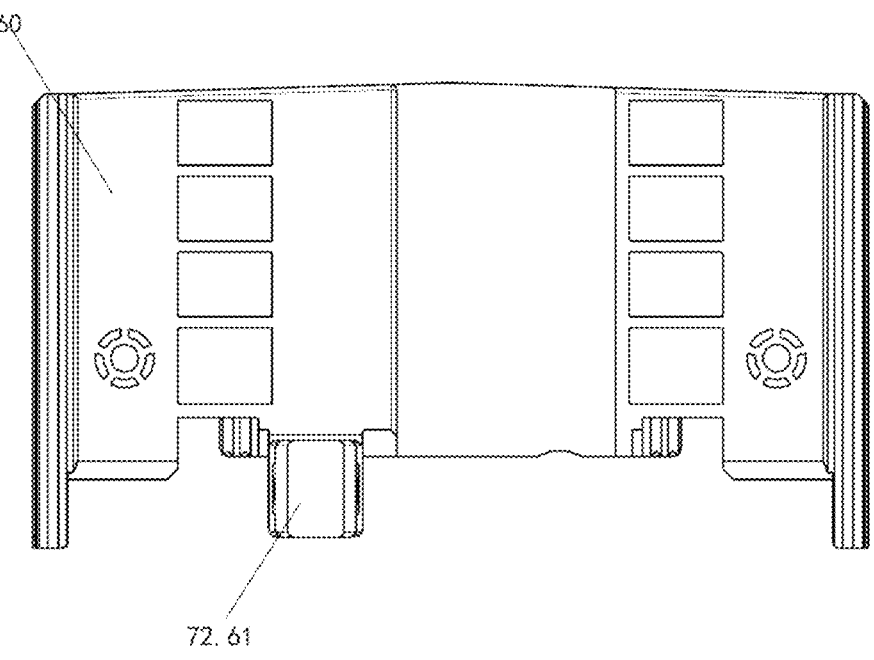
FIG. 15 is a schematic structural view of the slider in the zero-gravity seat headrest device according to the present application.
Figure 16:
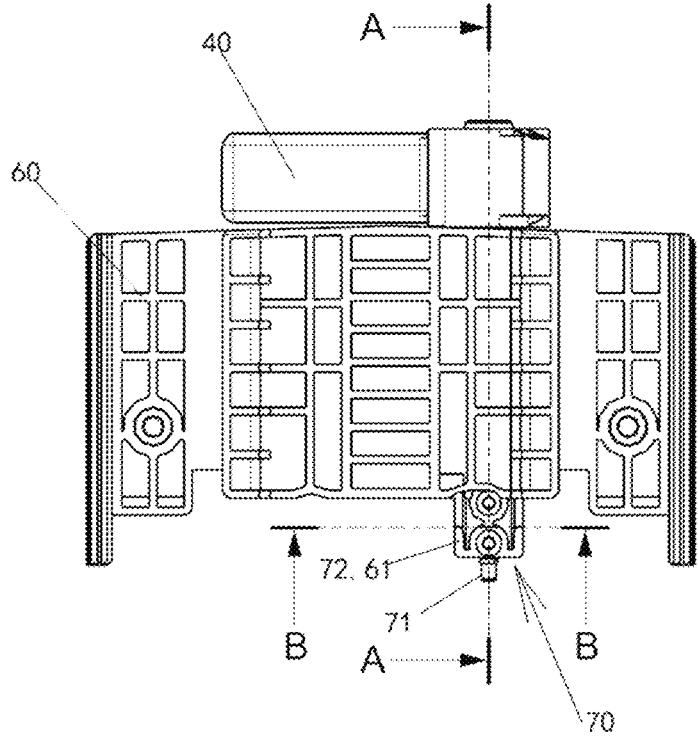
FIG. 16 is a front view of the drive connection between the headrest electric motor and the slider in the zero-gravity seat headrest device according to the present application.
Figure 17:
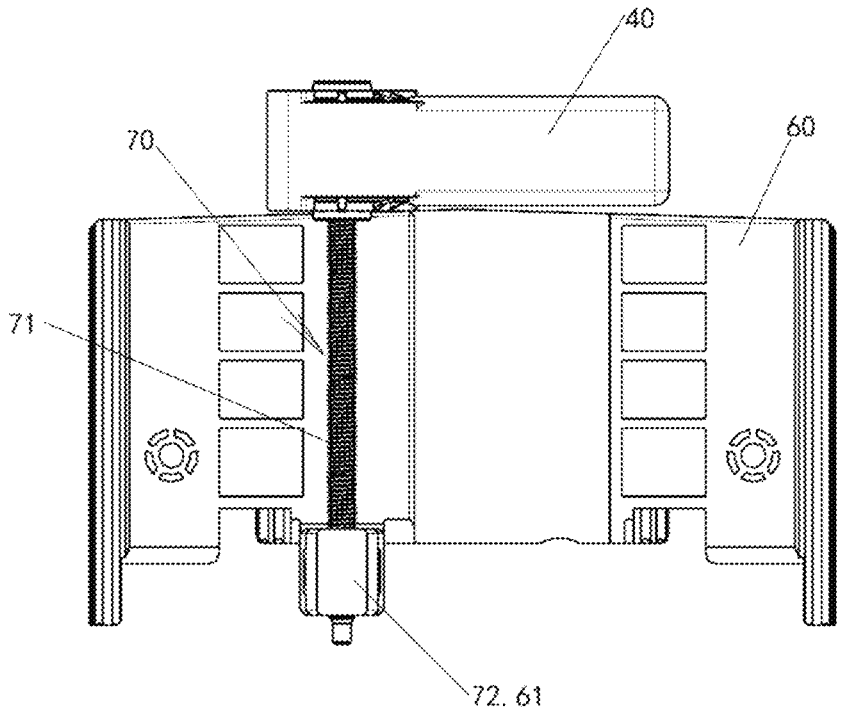
FIG. 17 is a rear view of the drive connection between the headrest electric motor and the slider in the zero-gravity seat headrest device according to the present application.
Figure 18:
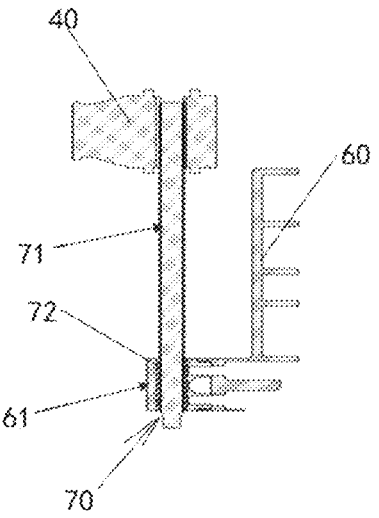
FIG. 18 is a cross-sectional view along the line A-A in FIG. 16.
Figure 19:
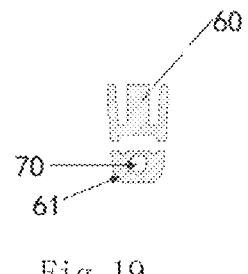
FIG. 19 is a cross-sectional view along the line B-B in FIG. 16.

In particular referring to FIGS. 10-12, the headrest electric motor 40 is mounted to a motor mounting plate 42 through motor fixing screw bolts 41, and the motor mounting plate 42 is mounted to the slider base 50 through screws 43. The screw-nut mechanism 70 is a set, wherein an upper end of a lead screw 71 penetrates through a lead screw hole 42a in the motor mounting plate 42 and is connected with an output shaft of the headrest electric motor 40, and a lower end of the lead screw 71 is arranged in the slider base 50 through a shaft.

Two sets of pinion-rack mechanisms 10 are provided, wherein the two sets of pinion-rack mechanisms 10 are symmetrically mounted to the left side and the right side of the slider base 50 parallel to an axial direction of the lead screw 71 (it's noted that the two sets of pinion-rack mechanisms 10 are not limited to a symmetrical arrangement).

Figures 20, 21:
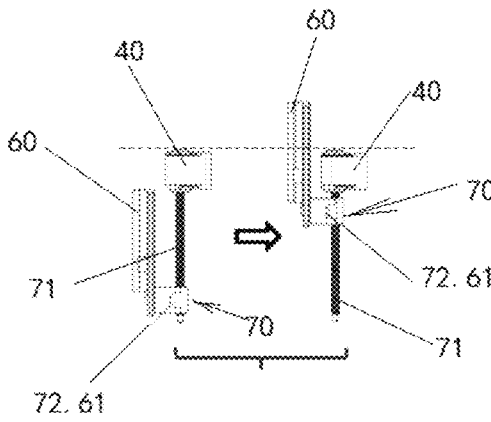
FIG. 20 is a schematic view for illustrating that the headrest electric motor drives the slider through the screw-nut mechanism in the zero-gravity seat headrest device according to the present application in an initial state.
FIG. 21 is a schematic view for illustrating that the headrest electric motor drives the slider through the screw-nut mechanism to an uppermost position in the zero-gravity seat headrest device according to the present application.
Figure 22:
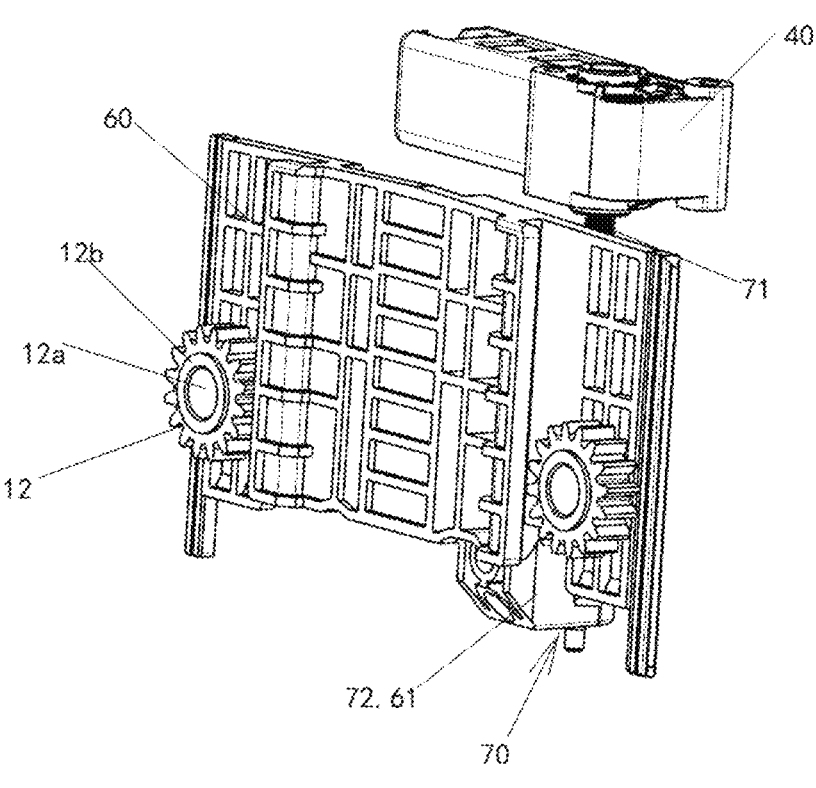
FIG. 22 is a three-dimensional schematic view for illustrating that a pinion is mounted to a slider in the zero-gravity seat headrest device according to the present application.
Figure 23:
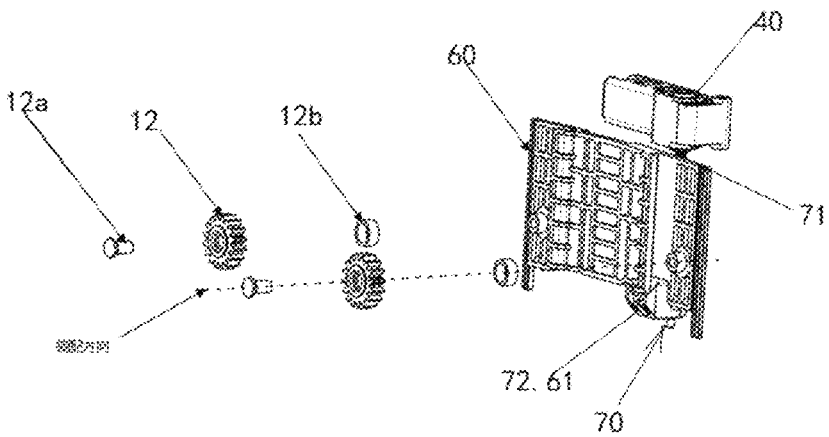
FIG. 23 is an exploded view for illustrating that the pinion is mounted to the slider in the zero-gravity seat headrest device according to the present application.
Figure 24:
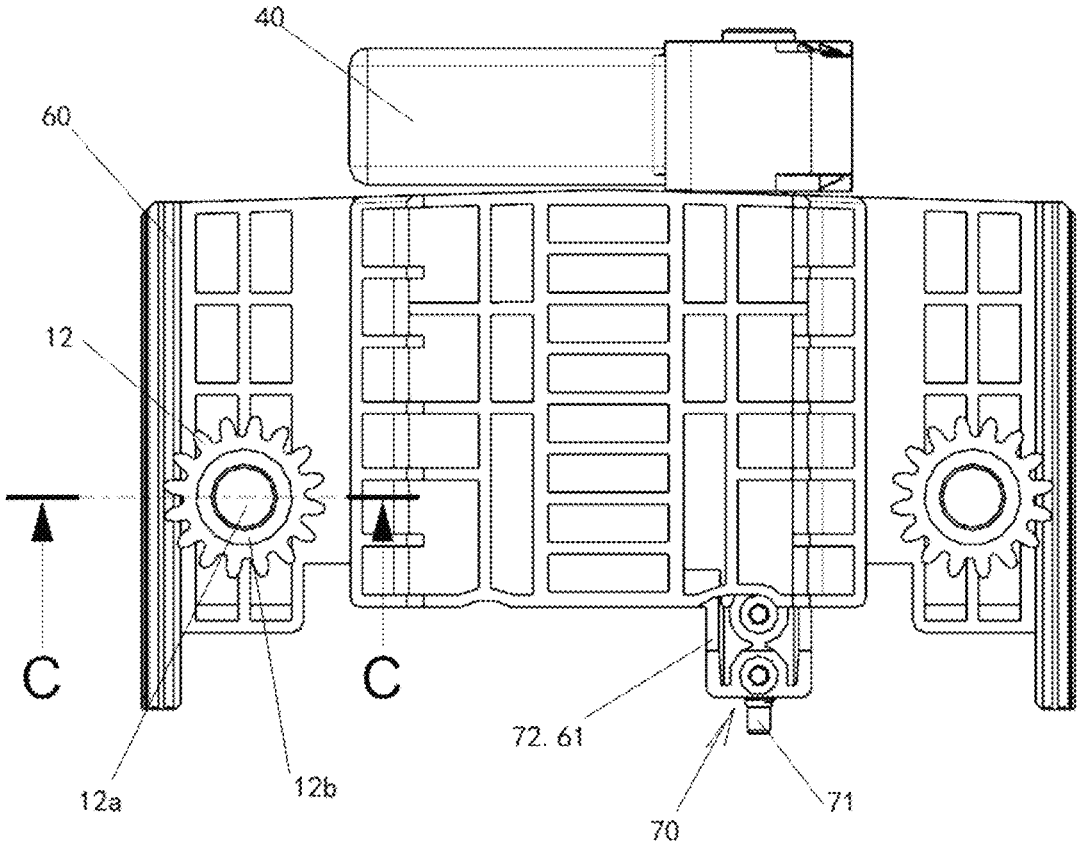
FIG. 24 is a front view for illustrating that the pinion is mounted to the slider in the zero-gravity seat headrest device according to the present application.
Figure 25:
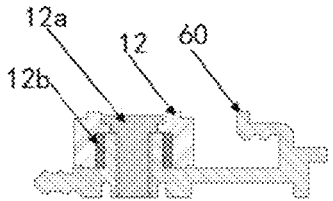
FIG. 25 is a cross-sectional view along the line C-C in FIG. 24.
Figure 26:
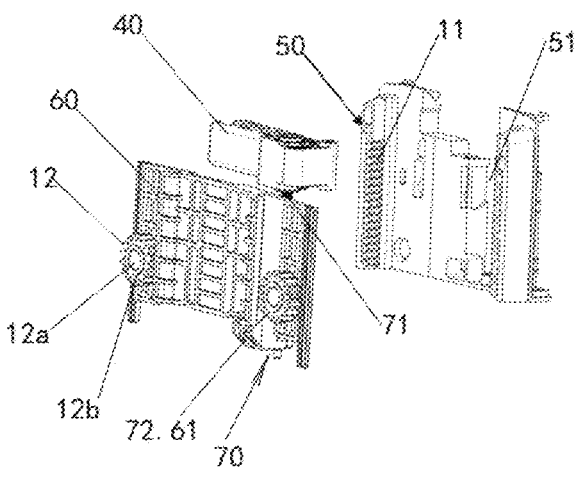
FIG. 26 is a schematic exploded view of a pinion, a slider, a headrest electric motor and a slider base in the zero-gravity seat headrest device according to the present application.
Figure 27:
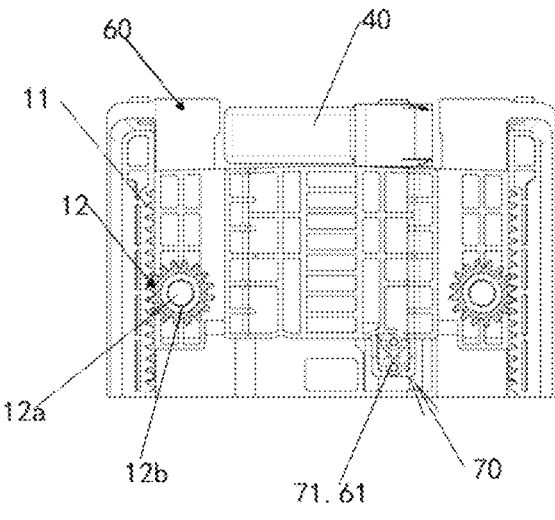
FIG. 27 is a schematic view for illustrating the engagement of the pinion with the fixed rack on the slider base in the zero-gravity seat headrest device according to the present application.
Figure 28:
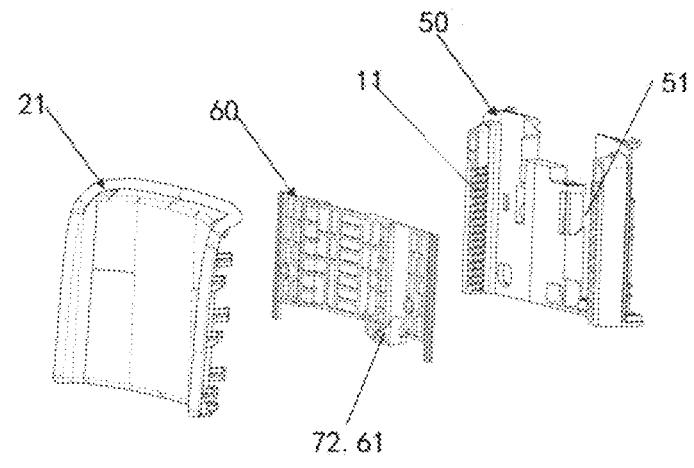
FIG. 28 is a schematic exploded view of the headrest (the headrest electric motor is removed) in the zero-gravity seat headrest device according to the present application in a perspective.
Figure 29:
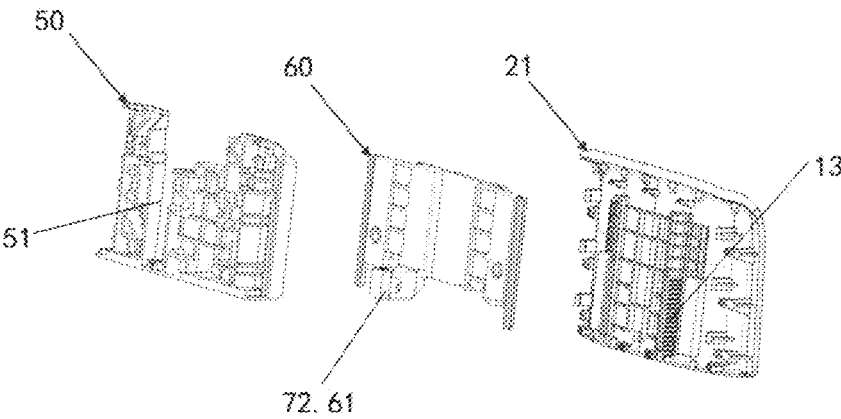
FIG. 29 is a schematic exploded view of the headrest (the headrest electric motor is removed) in the zero-gravity seat headrest device according to the present application in another perspective.
Figure 30:
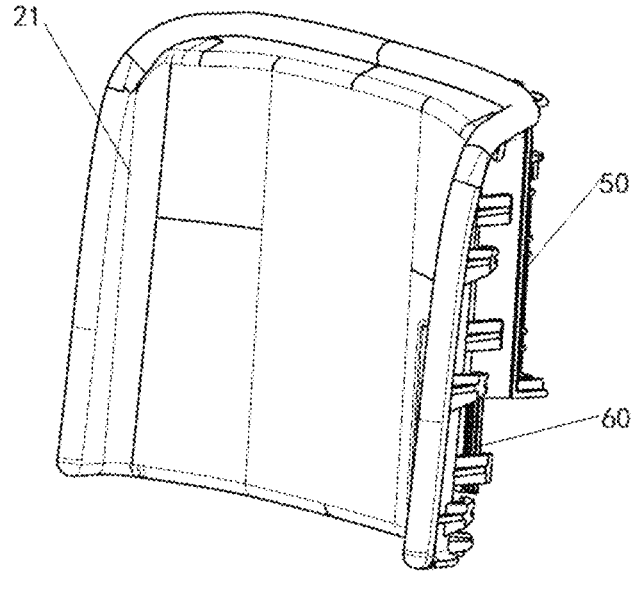
FIG. 30 is a three-dimensional schematic view of the headrest (the headrest rear cover is removed) in the zero-gravity seat headrest device according to the present application.
Figure 31:
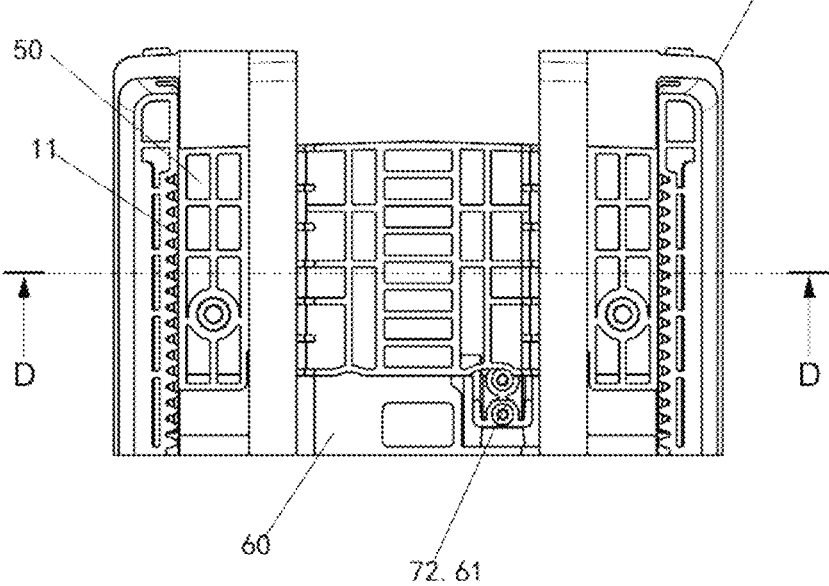
FIG. 31 is a schematic plan view of the headrest (the headrest rear cover is removed) in the zero-gravity seat headrest device according to the present application.
Figure 32:
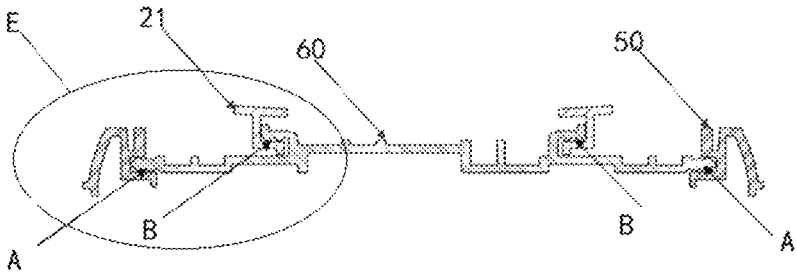
FIG. 32 is a cross-sectional view along the line D-D in FIG. 31.
Figure 33:
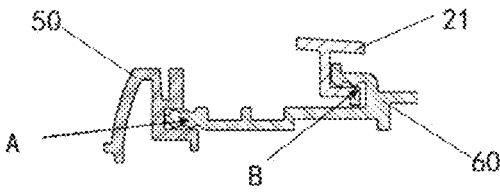
FIG. 33 is an enlarged schematic view of a region E in FIG. 32.

Referring to FIGS. 13-21, a nut 72 of the screw-nut mechanism 70 is mounted to a nut receptacle 61 of the slider 60, wherein the nut 72 engages with the lead screw 71, wherein the headrest electric motor 40 drives the slider 60 to move up and down by means of the screw-nut mechanism 70 (in particular see FIGS. 20 and 21).

For improvement of the stability of the up-down movement of the slider 60, the slider base 50 is provided with a guide groove 51 for the nut receptacle, and the nut receptacle 61 moves up and down in the guide seat 51 for the nut receptacle.

Referring to FIGS. 22-27, the two pinions 12 of the two sets of pinion-rack mechanisms 10 are mounted to the left side and the right side of the slider 60 parallel to its movement direction by means of respective countersink screws 12a and bushings 12b sleeved on the countersink screws 12a, wherein each pinion 12 engages with the fixed rack 11 of the same set of pinion-rack mechanism 10, and is rotatable around an axis of the countersink screw 12a. When the headrest electric motor 40 drives the slider 60 to move up and down through the screw-nut mechanism 70, the pinions 12 move up and down along with the slider 60, and rotate at the same time under their engagement with the fixed racks 11.

Referring to FIGS. 28-33, the movable racks 13 in the two sets of pinion-rack mechanisms 10 are symmetrically mounted to the left side and the right side of the headrest front cover 21 parallel to a movement direction of the headrest 20 (it's noted, the present invention isn't limited to a symmetrical arrangement). The two movable racks 12 engage with the respective pinions 12. When the slider 60 moves up and down, the pinions 12 are driven to move up and down. As the pinions 12 engage with the fixed racks 11, the pinions 12 rotate about their own axis, the self-rotating pinions 12 engage with the movable racks 13, and the movable racks 13 drive the headrest front cover 21, and hence drives the headrest 20 to move up and down, wherein the stroke of the headrest 20 is increased.

The slider 60 and the slider base 50 are coupled in a slidable manner through a pair of first sliding rail structures A; and the headrest 20, in detail the headrest front cover 21, and the slider 60 are coupled in a slidable manner through second sliding rail structures B, so that the stability of the movement of the headrest 20 is ensured.

The headrest adjusting mechanism comprising the screw-nut mechanism 70 and the pinion-rack mechanism 10 can meet various requirements of a zero-gravity seat.

It should be noted, the terms used herein are for the purpose of describing particular aspects only and are not intended to be limiting of the disclosure. As used herein, the singular forms "a", "an" and "the" are intended to include the plural forms as well, unless the context clearly indicates otherwise. It will be further understood that the terms "comprise" and "include" and the like, when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on", "coupled to" or "connected to" another element, the element may be formed directly on, coupled to or connected to the other element, or there may be one or more intervening elements therebetween. In contrast, terms such as "directly on", "directly coupled to" and "directly connected to", when used herein, indicate that no intervening elements are present. Other words used to describe the relationship between elements should be interpreted in a like fashion (i.e., "between" versus "directly between", "attached" versus "directly attached", "adjacent" versus "directly adjacent", etc.).

Terms such as "top", "bottom", "upper", "lower", "above", "below", etc. herein are used to describe the relationship of one element, layer or region with respect to another element, layer or region as shown in the attached drawings. It can be understood that in addition to the orientations described in the drawings, these terms should also include other orientations of the device.

It will be understood that, although the terms "first", "second", etc. may be used herein to describe various elements, these elements should not be limited by these terms. These terms are only used to distinguish one element from another. Thus, a first element could be termed a second element without departing from the teachings of the inventive concept.

It will be understood that, all the exemplary embodiments disclosed in the present patent application can be combined to each other arbitrarily.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

The invention claimed is:

1. A seat headrest device comprising:
a fixed base, which is configured to be mounted to a seat backrest,
a headrest,
a headrest electric motor, and
a composite motion mechanism comprising a screw-nut mechanism and a pinion-rack mechanism, wherein the headrest electric motor can drive the headrest to move relative to the fixed base through the composite motion mechanism,
the screw-nut mechanism comprising a lead screw which is drivable by the headrest electric motor to rotate and a nut which is movable along the lead screw,
the pinion-rack mechanism comprising a pinion coupled with the nut and a movable rack coupled with the headrest,
the pinion and the nut coupled by a slider,
the nut fixedly mounted to the slider,
the pinion rotatably mounted to the slider.

2. The seat headrest device as recited in claim 1, wherein the headrest electric motor can drive the headrest to move up and down relative to the fixed base through the composite motion mechanism.

3. The seat headrest device as recited in claim 1 wherein the seat headrest device is configured for a zero-gravity vehicle seat.

4. The seat headrest device as recited in claim 1, wherein the seat headrest device further comprises a headrest support rod, which is configured to mount the fixed base to the seat backrest.

5. The seat headrest device as recited in claim 1, wherein the pinion is rotatably mounted to the slider through a countersunk screw and a bushing sleeved on the countersunk screw, wherein the countersunk screw is fixed to the slider.

6. The seat headrest device as recited in claim 1, wherein the headrest is fixed to the movable rack.

7. The seat headrest device as recited in claim 1, wherein the pinion-rack mechanism further comprises a fixed rack wherein the fixed rack and the movable rack are opposite to each other with respect to the pinion, and engage with the pinion respectively.

8. The seat headrest device as recited in claim 1, wherein the headrest has a chamber, and the seat headrest device comprises an internal base, wherein the internal base is arranged in the chamber of the headrest and penetrates through the headrest and is fixed to the fixed base.

9. The seat headrest device as recited in claim 8, wherein the headrest electric motor, the screw-nut mechanism and the pinion-rack mechanism are arranged in the chamber of the headrest, wherein the headrest electric motor is fixedly mounted to the internal base.

10. The seat headrest device as recited in claim 8 wherein the headrest is movably supported on the internal base by the pinion-rack mechanism.

11. The seat headrest device as recited in claim 8, wherein the seat headrest device further comprises the slider, wherein the slider is arranged in the chamber of the headrest, the slider is drivable by the headrest electric motor to move up and down relative to the internal base through the screw-nut mechanism, wherein the lead screw of the screw-nut mechanism is connected with an output shaft of the headrest electric motor, wherein the pinion-rack mechanism comprises a fixed rack that is fixed to the internal base, wherein the pinion engages with the fixed rack and the movable rack, wherein the fixed rack and the movable rack are opposite to each other with respect to the pinion.

12. The seat headrest device as recited in claim 11, wherein the slider has a nut receptacle that receives the nut, and the internal base has a guide groove for the nut receptacle, wherein the nut receptacle is guidable in the guide groove for the nut receptacle.

13. The seat headrest device as recited in claim 11 wherein the slider and the internal base are coupled in a slidable manner through a first sliding rail structure, and the headrest and the slider are coupled in a slidable manner through a second sliding rail structure.

14. The seat headrest device as recited in claim 11, wherein the seat headrest device comprises two sets of pinion-rack mechanisms arranged side by side, the respective fixed racks of the two sets of pinion-rack mechanisms and the slider form a U-shaped part, and the respective pinions of the two sets of pinion-rack mechanisms are arranged between the two fixed racks and engage with the associated fixed racks.

15. The seat headrest device as recited in claim 1, wherein the seat headrest device comprises one set of screw-nut mechanism and two sets of pinion-rack mechanisms arranged side by side, wherein the one set of screw-nut mechanism is arranged between the two sets of pinion-rack mechanisms.

16. The seat headrest device as recited in claim 1, wherein the headrest comprises a headrest front cover and a headrest rear cover.

17. The seat headrest device as recited in claim 15, wherein the headrest comprises a headrest front cover and a headrest rear cover, wherein the headrest front cover is provided with the respective movable racks of the two sets of pinion-rack mechanisms.

18. A vehicle seat comprising the seat headrest device as recited in claim 1.

* * * * *